May 14, 1957 H. B. BROOKS 2,792,497

CRYSTAL CONTROLLED MARKER PULSE GENERATOR

Filed Feb. 23, 1954 2 Sheets-Sheet 1

INVENTOR.
HERBERT B. BROOKS,
BY Nicholas T Volsk
HIS ATTORNEY.

May 14, 1957 H. B. BROOKS 2,792,497

CRYSTAL CONTROLLED MARKER PULSE GENERATOR

Filed Feb. 23, 1954 2 Sheets-Sheet 2

INVENTOR.
HERBERT B. BROOKS,
BY
Nicholas T Volk
HIS ATTORNEY.

United States Patent Office 2,792,497

Patented May 14, 1957

2,792,497

CRYSTAL CONTROLLED MARKER PULSE GENERATOR

Herbert Berwick Brooks, Tucson, Ariz., assignor to Hughes Aircraft Company, Culver City, Calif., a corporation of Delaware Application February 23, 1954, Serial No. 411,630

7 Claims. (Cl. 250—27)

This invention relates to timing circuits and more particularly to a system which, in response to a trigger pulse, produces a train of accurately and equally spaced marker pulses for cathode ray tube display use, or accurate frequency reference.

The prior art discloses circuits for generating pulse-initiated marker trains in which the input trigger pulse shock excites a sinusoidal, exponentially decaying wave in a resonant circuit. This sinusoidal wave is then clipped, and the resulting square wave is impressed on a peaking circuit or other suitable circuit which forms the marker pulses of the desired shape. The accuracy and stability of such circuits are limited to the stability of the components.

The continuously oscillating quartz crystal has long been utilized in the communication art because of its very desirable high frequency stability. However the successful application of such crystal controlled circuits in high frequency marker applications such as 2 megacycle generators involves a number of difficulties.

An example of a prior art crystal controlled marker generator which employed single frequency oscillating quartz crystals operating at about 82 kilocycles is described in "Waveforms," edited by Chance et al., vol. 19 of the "Radiation Laboratory Series," published by McGraw-Hill Book Co., Inc., New York, 1949, on page 145, sec. 4–15.

One of the difficulties of the utilization of the wave train resulting from shock excitation results from the decrease in amplitude of each succeeding cycle at an exponential rate. It is necessary that the oscillatory excursions be confined to a constant amplitude by a suitable clipping circuit. A necessary requirement of this operation in order to make use of a fair plurality of pulses is that the resulting amplitude of the wave train cannot exceed the amplitude of the excursion of the last cycle to be utilized. Resulting low amplitude of the clipped train of pulses necessitates the utilization of high gain amplifiers to increase the amplitude to a useful magnitude. High gain amplifiers must therefore be used and the necessary stability of such amplifiers results in undue complexity of the resulting apparatus.

In addition, the clipping circuits operating on the exponential wave train must themselves be exceedingly accurate in the level of clipping when operating on a low amplitude wave train. The reason for this is that a particular variation in clipping level of a low amplitude wave results in a greater percentage error than the same variation in clipping of a high amplitude wave.

Accordingly, it is an object of this invention to provide a circuit with which to produce marker pulses that are equally and uniformly spaced to an interval accuracy within 0.01 microsecond, the operation of which circuit is initiated within 0.03 microsecond, after the impression of an input trigger pulse.

Another object of the invention is to provide in the marker generating circuit a piezoelectric quartz plate of a particular crystallographic orientation in which the amplitude of the principal mode of oscillation exceeds that of spurious modes by a ratio of at least ten to one for controlling the generation of the marker pulses.

These and other objects and advantages of this invention will become apparent from the following description taken together with the accompanying drawings in which.

Figure 1:
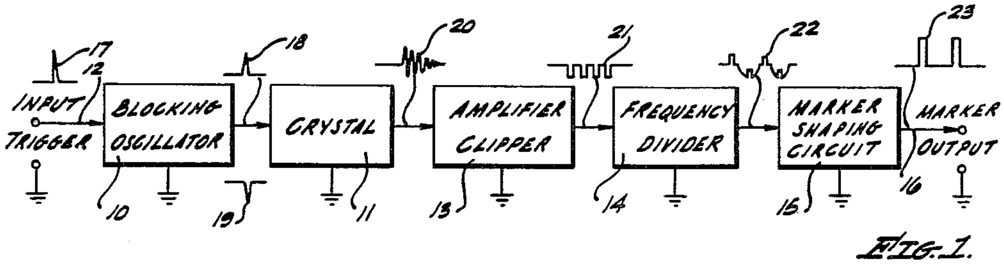
Fig. 1 is a block diagram of the pulsed crystal marker generator.

Referring now to Fig. 1, the block diagram of the major circuit components of the pulsed crystal marker generator of this invention is shown along with the waveshapes of the voltages and pulses appearing at various points in the system. A blocking oscillator 10 is coupled to a quartz oscillator crystal 11. Trigger pulses for exciting the blocking oscillator 10 are impressed on its input terminal 12. Crystal 11 is coupled to an amplifier and clipper circuit 13, which in turn is coupled to a frequency divider 14. The output of frequency divider 14 is applied to an overbiased amplifier circuit 15, from which the marker pulses 23 are derived at its output terminal 16.

The above enumerated system components of the pulsed crystal marker generator circuit operate as follows: Blocking oscillator 10 is triggered into oscillation by positive-going synchronizing pulses 17 applied to terminal 12 from an external source and generates in-phase opposite polarity pulses 18 and 19. Each pulse 18 and 19 occurring during the operation of blocking oscillator 10 shock excites crystal 11 into oscillation at the crystal's natural vibration frequency. The oscillatory output of the crystal is shown by damped train of waves 20. The oscillation voltage generated by the crystal 11 is applied to, amplified and "clipped" by amplifier-clipper 13, to provide a series of "square" topped pulses 21 which are applied to a frequency divider 14. Frequency divider 14 produces a train of voltage pulses as shown by waveform 22. A voltage having waveform such as shown at 22 is applied to overbiased amplifier circuit 15. The resultant marker pulses shown in waveform 23 are available for utilization at output terminal 16.

Figure 2:
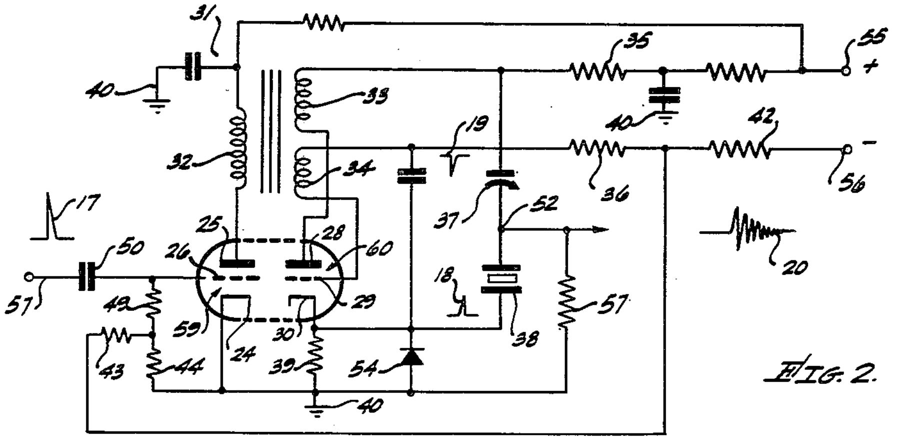
Fig. 2 shows the crystal excitation circuit of the marker generator.

Fig. 2 is a circuit diagram of the blocking oscillator crystal exciter circuit generally shown by blocks 10 and 11 of Fig. 1.

Double triode vacuum tube 24 is employed as a combination trigger pulse amplifier and blocking oscillator.

The pulse amplifier 59 comprises triode elements 25, 26, and 27. The blocking oscillator 60 comprises triode elements 28, 29 and 30. A transformer 31 including a primary winding 32 and two secondary windings 33 and 34 performs a dual function as coupling transformer between pulse amplifier 59 and blocking oscillator 60 and as the blocking oscillator feed-back transformer. Transformer winding 33 is connected between plate 28 of blocking oscillator triode 60 and an output load resistor 35. Winding 34 is connected between grid 29 of blocking oscillator triode 60 and a negative bias isolation resistor 36. Windings 33 and 34 are poled so as to provide regenerative coupling between grid 29 and plate 28. A variable capacitor 37 is connected between the junction of output load resistor 35 with transformer plate winding 33 and one terminal of a quartz oscillator crystal 38. The other terminal of crystal 38 is connected to cathode 30 of blocking oscillator triode 60. A resistor 39 is connected between cathode 30 and a ground connection 40. A bypass capacitor 41 is connected from the grid return end of grid winding 34 to cathode 30. A rectifier 54 is connected between cathode 30 and ground 40; rectifier 54 is poled to conduct any negative-going pulses to ground.

A capacitor 50 serially couples input terminal 51 with grid 26 of pulse amplifier section 59 of triode 24. Resistors 44 and 49 connected in series between grid 26 and ground 40 comprise a grid leak resistance for pulse amplifier triode 59. Cathode 27 of pulse amplifier 59 is connected to ground 40. Primary winding 32 of transformer 31 is coupled between plate 25 of pulse amplifier triode 59 and a source of anode potential indicated by numeral 55. A negative bias potential is applied at terminal 56 through isolation resistors 42 and 43 for impression on the grid 26 of triode 59 and through resistors 42, 36 and transformer winding 34 on the grid 29 of triode 60. Resistor 57 is an output load resistor connected between ground 40 and the junction 52 of crystal 38 with capacitor 37.

From the above-described circuit shown in Fig. 2, the operation of the pulsed crystal oscillator may be seen to be as follows: After power has been applied to the circuit for plate voltage, grid bias and filaments (not shown), a trigger pulse of positive polarity such as shown at 17 may be applied to input terminal 51. The pulse is applied through capacitor 50 to the grid 26 of the pulse amplifier 59. The pulse amplifier 59 is normally biased to a low plate current operation. When the positive pulse 17 is applied, a rapid rise in plate current occurs in triode 59 and in primary 32. A voltage pulse is generated in grid winding 34 of the transformer 31 and this pulse is impressed with positive polarity on grid 29 of triode 60.

Triode 60 is normally biased to plate current cutoff by the negative potential applied to grid 29. The positive-going pulse generated in winding 34 starts the blocking oscillator action and a very large negative-going voltage pulse is developed in the plate winding 33 as shown at 19. This appears across load resistor 35. At the same time a very large positive voltage pulse 18 is developed at cathode 30 and appears across cathode resistor 39. Both of pulses 18 and 19 are extremely sharp and in the embodiment shown in Fig. 2 may have an ampltiude of about 30 volts each. The blocking oscillator produces only one oscillation resulting in pulses such as 18 and 19 for each trigger pulse 17 applied to the input terminal 51. The pulses 18 and 19 are applied to opposite sides of crystal 38 whereupon the crystal 38 is excited into an oscillation resulting at point 52 in the damped oscillation train 20.

The positive and negative pulses, being applied to opposite terminals of the crystal act in aiding relationship to shock it into oscillation. However, the pulses 18 and 19 are in bucking relationship with each other at the point 52 with respect to ground, and thus tend to cancel each other. There remains as an output signal across resistor 57 substantially only the damped oscillation 20. On the arrival of a subsequent pulse 17 the next cycle is initiated.

Damped oscillations such as shown at 20 (in Fig. 1), developed as a result of the shock excitation of crystal 38 are applied to an amplifier clipper circuit, shown by block 13 in Fig. 1. The circuit of block 13 may be any one of many well-known over-biased circuits which produce pulses in their output such as 21 when sine wave signals are applied at the input. An example of such circuits is shown in the "slicer" circuit illustrated and described on p. 156 of "Pulse Techniques" by Moskowitz and Racker published 1951 by Prentice-Hall, Inc., New York.

Figure 3:
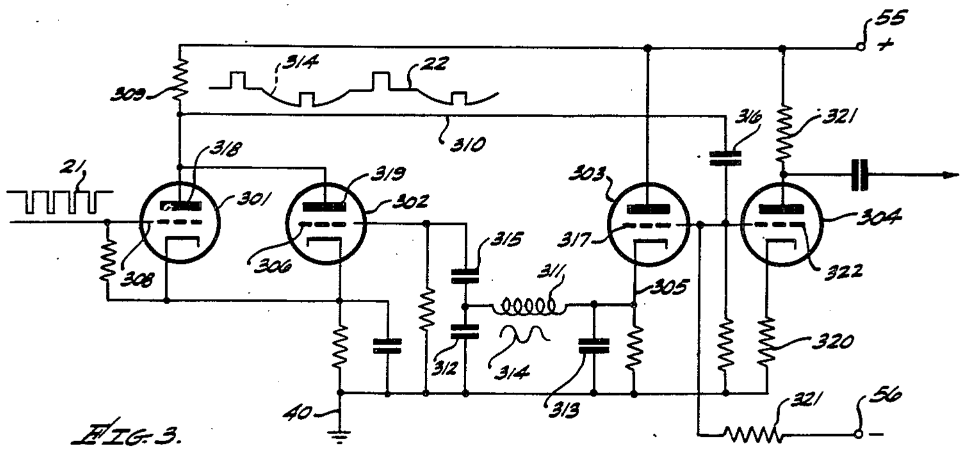
Fig. 3 is a circuit diagram of a 2:1 frequency divider employed in the invention.
Figure 4:
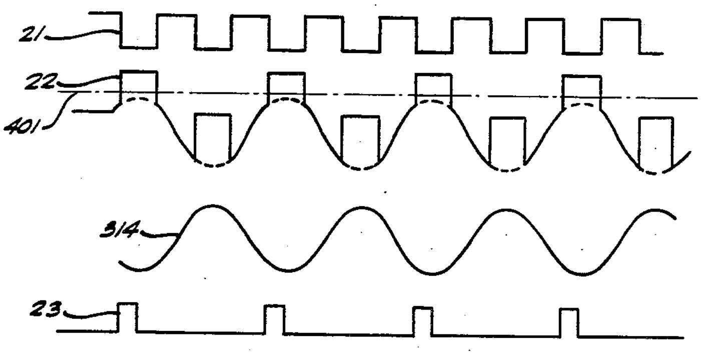
Fig. 4 is a series of waveforms of the divider of Fig. 3 showing the operation for various ratios of division.

A frequency dividing circuit particularly useful in the practice of the present invention is shown in Fig. 3. Waveforms are shown in Fig. 4 to illustrate the operation of the divider circuit of Fig. 3.

Referring to Fig. 3 triode 301 is an amplifier for the input pulses, 21. Triodes 302 and 303 in conjunction with resonant feedback circuit 311, 312, 313 and 315 constitute an oscillator.

The common output load circuit 309 coupled to anode 318 and 319 of triodes 301 and 302, respectively, causes mixing of the pulses from anode 318 and the sine wave from anode 319 to form a composite wave 22.

In order to obtain a division of two with respect to the input pulses, the triode 303 is biased to a negative potential such that only the positive pips of the mixed wave is passed to the output of triode 303. Triode 304 has a cathode bias resistor 320 connected between its cathode and ground, and a plate load resistor 321 connected between its plate and a B+ terminal 55.

Rectangular negative going pulses identified by numeral 21 are impressed on the input of the circuit of Fig. 3 at the grid 308 of triode 301. At the load resistor 309 common to both triodes 301 and 302 positive pulses appear due to their generations in tube 301. The positive pulses are coupled through capacitor 316 to grid 317 of triode 303. A positive pulse is developed in cathode 305 of cathode follower 303 as a result of each positive pulse in the grid. The tuned circuit including 311, 312, 313 is resonant at one-half the pulse repetition rate of wave 21. The result, a sine wave 314 at half the frequency of wave 21 is generated in the foregoing described tuned circuit in response to each pulse developed at the cathode 305. The sine waves are applied to grid 306 through capacitor 315. On the positive half cycle of the sine wave 314 applied to grid 306 the resulting negative going portion of the sine wave developed in the plate circuit of triode 302 is combined across common load resistor 309 with a positive pulse developed in the plate circuit of triode 301. On the negative half cycle of sine wave 314 applied to grid 306 the resulting positive going wave is combined with the next positive going pulse across common plate circuit load resistor 309. The waveform 22 results at the common plate lead 310.

It may be seen then that waveform 22 now comprises one of the positive pulses developed in the plate circuit 318 of triode 301 for each half cycle of the sine wave appearing at the plate circuit 319 of triode 302. Because the plates of triodes 301 and 302 are connected together the common plate load resistor 309 of the two triodes 301 and 302 will algebraically additively combine the pulse wave 21 and sine wave 314 applied respectively at the grids of triodes 301 and 302. The resulting composite wave 22, has a waveform including positive pulses appearing alternately at crest and in the valley of the sine wave. It may be seen that if a voltage with a waveform of the composite wave 22 is applied to an amplifier, biased appropriately, only the most positive going peaks will be amplified. Those failing to exceed the cut off bias level to which the amplifier is adjusted fail to appear in the output with the result that the output signal of such a pulse amplifier will be one pulse for each two of the pulses 21 applied at grid 308 of triode 301.

Triode 304 functions as an overbiased pulse amplifier such as described above. Negative bias applied to the grid 322 maintains the triode 304 at a level of low plate current. This level is such that only when the voltage of waveform 22 applied to grid 322 exceeds the bias level will conduction result. The dashed line 401 in Fig. 4 illustrates the bias level above which triode 304 conducts. The output waveform developed in the plate circuit of triode 304 is then similar to waveform 23 of Fig. 4.

Figures 5, 6:
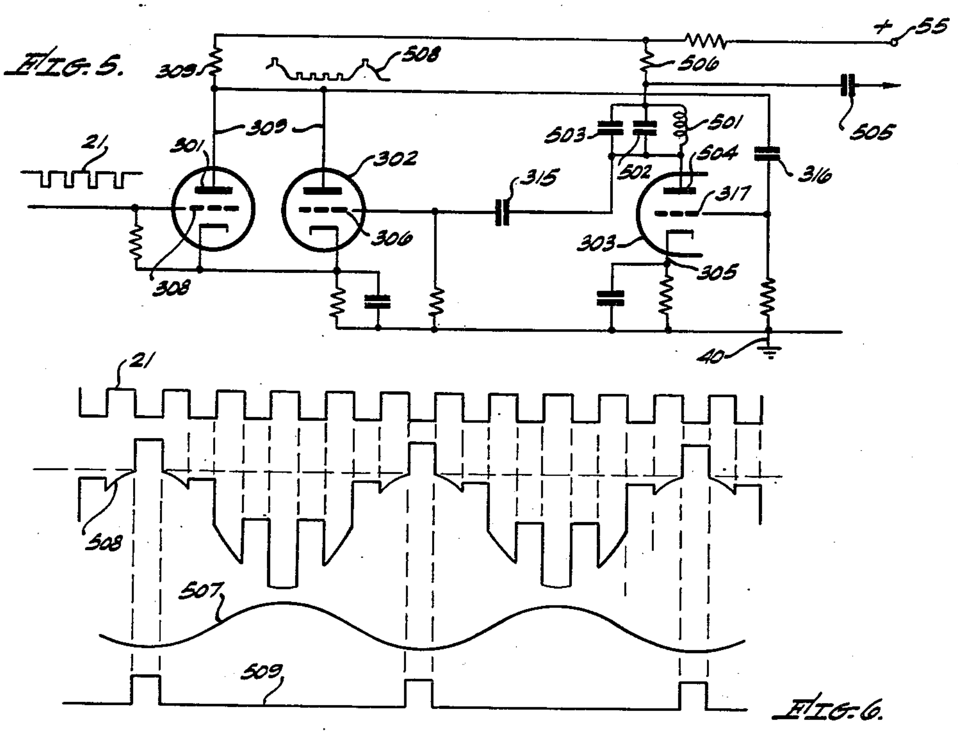
Fig. 5 is a circuit diagram of the 5:1 divider circuit employed in this invention.
Fig. 6 is a series of waveforms of the divider shown in Fig. 5.

It is sometimes desirable to divide the fundamental marker frequency by five. 5:1 frequency divider is shown in Fig. 5. The operation of the circuit of Fig. 5 is quite similar to the operation of the circuit of Fig. 3.

Elements of Fig. 5 that are identical with those of Fig. 3 bear the same reference characters. The waveforms of Fig. 6 refer to operation of the circuit of Fig. 5.

In triode 303 (Fig. 5) a tuned circuit comprising inductor 501 and capacitors 502 and 503 is connected in the plate circuit between plate 504 and a load resistor 506. An output coupling capacitor 505 is connected from the junction of the tuned circuit 501, 502, 503, and load resistor 506 to an external circuit (not shown). Coupling capacitor 315 is connected between plate 504 and grid 306.

The tuned circuit 501, 502, 503 in the plate circuit 504 has a resonant frequency of one-fifth of the pulse frequency and otherwise has a similar function to the tuned circuit 311, 312, 313 which is connected in the cathode circuit of triode 303 in Fig. 3.

Operating in a manner similar to that of the circuit of Fig. 3, the tuned circuit of Fig. 5 develops a sine wave oscillation when excited by pulses such as 21 after these pulses are applied through triode 301 and capacitor 316 to triode 303. The sine wave 507 (Fig. 6) is applied to grid 306.

It can be seen that in the same manner as described above for Fig. 3, the wave 507 and pulses 21 are mixed across the common plate circuit 309 of the triodes 301 and 302 to form composite wave 508. If the composite wave 508 is applied to a circuit, not shown, but such as described above for triode 304 (Fig. 3), the resulting waveform would be as shown at 509 in Fig. 6. Waveform 509 has one pulse for each five of waveform 21.

Since the pulses of waveform 21 as applied either to the circuit of Fig. 3 or to that of Fig. 5, are accurately spaced, due to the control of the quartz crystal circuit of Fig. 2, then it follows that the pulses of waveform 23 (Fig. 4) and 509, (Fig. 5) will be spaced equally as accurately. This is true because the frequency dividers of Fig. 3 and Fig. 5 each merely suppress the unwanted pulses. The remaining pulses retain their original spacing as controlled by the quartz crystal.

Figure 7:
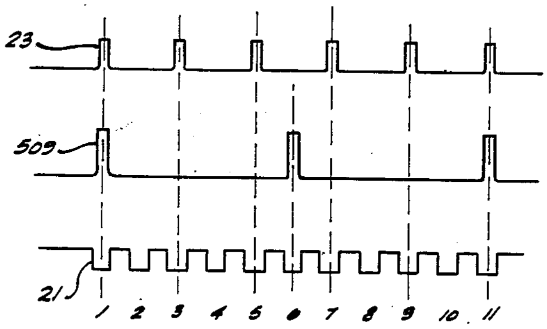
Fig. 7 is a series of waveforms of the output pulses of the system of this invention to illustrate the relationships of the pulses for the 2:1 and 5:1 condition, respectively.

In Fig. 7 there is shown the relationship between output waveforms and input waveforms of the system of this invention. At the bottom of the waveform grouping the negative wave 21 derived from crystal oscillator 11 and amplifier clipper 13 is shown operating at a pulse repetition frequency which may be 2000 kilocycles per second. The pulses shown are numbered for reference 1 through 11. Above the 2000 kc. pulse wave is waveform 509 which is the resulting waveform after a 5:1 division by the circuit of Fig. 5. In wave 509 there is one pulse for each five of wave 307. In wave 23 the result of 2:1 division is shown. The frequency dividers of Fig. 3 and Fig. 5 may be operated in series to provide combinations such as, for example, 10:1 or even greater ratios.

Thus, the elements of the system are such that when combined, it is possible to produce crystal controlled markers at a subharmonic ratio to the crystal controlled frequency wherein the markers will have the same spacing accuracy as the pulses of the crystal controlled frequency. It has been found, the accuracy of spacing of the marker pulses is improved greatly by the use of the special crystal defined in my application entitled, "Quartz Crystal Having a Low Level of Spurious Response," filed concurrently herewith.

What is claimed is:

1. In a crystal controlled marker pulse generator the combination of a blocking oscillator having an input terminal for receiving externally generated trigger pulses and first and second output terminals, said blocking oscillator being adapted to generate at each of said terminals, respectively, a sharp pulse in response to one of said trigger pulses, said sharp pulses being simultaneous, each simultaneous pulse being of opposite polarity with respect to a reference potential; and a piezoelectric crystal oscillator plate and a capacitor connected in series between said first and second output terminals, said piezoelectric crystal oscillator plate adapted to be shock excited by said simultaneous sharp pulses to produce an exponentially decaying train of evenly spaced oscillations at the junction of said quartz plate and said capacitor, said sharp pulses of opposite polarity being cancelled by one another at said junction, said junction of said piezoelectric crystal and said capacitor being connected as an output terminal.

2. A quartz crystal controlled marker pulse generating system comprising: a blocking oscillator circuit adapted to generate sharp pulses in response to trigger external pulses applied thereto, said oscillator having an output circuit; a piezoelectric oscillator crystal circuit connected to said output circuit of said blocking oscillator circuit and adapted to be excted by said sharp pulses to produce an exponentially decaying train of oscillations at a predetermined frequency; a clipper-amplifier coupled to said crystal circuit and adapted to receive said oscillations and to produce rectangular pulses at a repetition rate equal to the frequency of said oscillations; a frequency divider circuit coupled to said clipper-amplifier and adapted to receive said rectangular pulses and to produce output pulses at a repetition rate having a subharmonic relationship to said rectangular pulses, thereby providing discrete uniform time-spaced marker pulses.

3. A quartz crystal controlled marker pulse generating system comprising: a blocking oscillator having first and second output terminals said oscillator being adapted to produce a sharp voltage pulse at each of said terminals, respectively, said pulses being simultaneous and of opposite polarity with respect to a reference potential; a quartz crystal oscillator plate and a capacitor connected in series between said first and second output terminals and adapted to be shock-excited by said sharp pulses to produce a train of damped oscillations at the natural resonant frequency of said oscillator plate, said blocking oscillator and said crystal and capacitor combination being adapted to reduce said sharp pulses of opposite polarity to zero with respect to said reference potential at the junction of said quartz plate and said capacitor whereby said damped oscillations are substantially the only signals appearing at said junction; a clipper-amplifier coupled to said junction adapted to receive said damped oscillations an to produce rectangular pulses of uniform amplitude at a repetition rate equal to the frequency of said damped oscillations; and a frequency divider circuit coupled to said clipper-amplifier and adapted to receive said rectangular pulses and to produce output pulses at a repetition rate having a subharmonic relationship to said rectangular pulses.

4. A quartz crystal controlled marker pulse generating system as defined in claim 3 in which the said frequency divider circuit comprises: a pair of amplifying devices having independent input circuits and a common output circuit adapted to mix signals applied respectively to each of said input circuits; a pulse excited and synchronized oscillator, having an input circuit coupled to said common output circuit and a resonant output circuit coupled to one of said mixing input circuits, said resonant output circuit having a natural resonant frequency which is sub-harmonically related to an input pulse frequency, whereby said oscillator operates at said sub-harmonic frequency; and a negatively biased pulse amplifier also coupled to said common output circuit, whereby pulses applied to one of said mixing input circuits are applied to said oscillator to excite said oscillator to produce sine waves at said sub-harmonic frequency, said sine waves being applied to the other of said mixing input circuits, said sine waves and said pulses being mixed to produce a composite wave, said composite wave being applied to said pulse amplifier, said pulse amplifier being responsive only to the most positive portions of said composite wave to produce pulses having the same repetition frequency as the frequency of said sine waves.

5. A crystal controlled marker generator comprising a blocking oscillator adapted to receive externally generated trigger pulses and having a first and a second output terminal at each of which, respectively, there is simultaneously produced a sharp pulse in response to one of said trigger pulses, each simultaneous pulse being of opposite polarity with respect to a reference potential; a piezoelectric crystal and a capacitor, said crystal and capacitor being connected in series between said first and said second output terminals, the junction of said crystal and capacitor being an output terminal with respect to said reference potential, said crystal being adapted to be shock excited by said sharp pulses to produce a damped train of evenly spaced oscillations at the junction of said crystal with said capacitor, said simultaneous sharp pulses of opposite polarity being cancelled by one another, said evenly spaced oscillations having a frequency equal to the natural resonant frequency of said crystal; an amplitude limiting circuit, said amplitude limiting circuit being coupled to said junction to receive said damped train of evenly spaced oscillations and having an output circuit whereat uniform rectangular pulses of uniform amplitude are generated in response to said evenly spaced oscillations; a frequency divider circuit, said frequency divider circuit being adapted to generate in its output a single pulse in response to some greater number of said uniform rectangular pulses and integrally related thereto; and a pulse shaping circuit, said pulse shaping circuit being coupled to said frequency divider circuit and adapted to produce in its output sharp uniformly separated marker pulses at a frequency which is an accurate sub-multiple of the resonant frequency of said crystal, the said marker pulses being thereby controlled by said crystal.

6. A crystal controlled marker generator comprising a blocking oscillator having a push-pull output circuit, said oscillator being adapted to receive externally generated trigger pulses and to produce in response to one of said trigger pulses a pair of simultaneous sharp pulses of opposite polarity in said output circuit; a piezoelectric crystal and a capacitor, said crystal and capacitor being connected in series across said push-pull output circuit, the junction of said crystal and capacitor being an output terminal with respect to a reference potential, said crystal being adapted to be responsive to said sharp pulses to generate a damped train of oscillations having a frequency equal to the natural resonant frequency of said crystal; an amplitude limiting circuit, said amplitude limiting circuit being coupled to said junction to receive said damped train of oscillations, said limiting circuit being adapted to generate in its output rectangular pulses of uniform amplitude in response to said crystal oscillations applied to said limiting circuit; a frequency divider circuit, said frequency divider circuit being adapted to generate in its output a single pulse in response to a predetermined number of said uniform rectangular pulses, said number being an integral multiple of said single pulse; and a pulse shaping circuit, said pulse shaping circuit being coupled to said frequency divider circuit and adapted to produce in its output uniformly separated sharp marker pulses correspondng to the number of pulses generated by said frequency divider; the said number of said marker pulses being an integral sub-multiple of the resonant frequency of said piezoelectric crystal, the said marker pulses being thereby controlled by said piezoelectric crystal.

7. A crystal controlled marker generator comprising a blocking oscillator; a piezoelectric crystal circuit connected to said blocking oscillator and adapted to be shock excited into a damped train of oscillations at its natural resonant frequency by said blocking oscillator; an amplitude limiting circuit, said amplitude limiting circuit being coupled to said piezoelectric crystal circuit and adapted to receive said oscillations and to generate uniform rectangular pulses of uniform amplitude in response to said oscillations; a frequency divider circuit, said frequency divider circuit being coupled to said amplitude limiting circuit and adapted to generate in its output a single pulse in response to a predetermined greater number of said uniform rectangular pulses and integrally related thereto; and a pulse shaping circuit coupled to said frequency divider circuit and adapted to produce in its output uniformly separated sharp marker pulses at a frequency which is an integral sub-multiple of the oscillation frequency of said crystal, the said marker pulses being thereby controlled by said crystal.

References Cited in the file of this patent

UNITED STATES PATENTS

| | | |
|---|---|---|
| 2,188,653 | Faudell et al. | Jan. 30, 1940 |
| 2,277,000 | Bingley | Mar. 17, 1942 |
| 2,458,366 | Fyler | Jan. 4, 1949 |
| 2,493,517 | Applegarth | Jan. 3, 1950 |

OTHER REFERENCES

Waveforms, by Chance et al., vol. 19 of the "Radiation Laboratory Series," published by McGraw-Hill Book Company, Inc., 1949, sec. 4–15, pages 145 to 148. (Copy in Patent Office Library.)